United States Patent
Werner

(10) Patent No.: US 8,024,743 B2
(45) Date of Patent: *Sep. 20, 2011

(54) CONNECTION OF CLIENTS FOR MANAGEMENT OF SYSTEMS

(75) Inventor: Randolf Werner, Wiesloch-Baicrtal (DE)

(73) Assignee: SAP AG, Walldorf (DE)

( * ) Notice: Subject to any disclaimer, the term of this patent is extended or adjusted under 35 U.S.C. 154(b) by 1358 days.

This patent is subject to a terminal disclaimer.

(21) Appl. No.: 11/026,604

(22) Filed: Dec. 30, 2004

(65) Prior Publication Data

US 2006/0150197 A1 Jul. 6, 2006

(51) Int. Cl.
*G06F 13/00* (2006.01)
*G06F 15/00* (2006.01)

(52) U.S. Cl. .................... 719/311; 709/203

(58) Field of Classification Search .............. 719/311, 719/328; 709/201, 224
See application file for complete search history.

(56) References Cited

U.S. PATENT DOCUMENTS

| | | | |
|---|---|---|---|
| 5,999,179 A | 12/1999 | Kekic et al. | |
| 6,282,566 B1 * | 8/2001 | Lee et al. | 709/217 |
| 6,345,386 B1 * | 2/2002 | Delo et al. | 717/176 |
| 6,424,828 B1 | 7/2002 | Collins et al. | |
| 6,553,377 B1 | 4/2003 | Eschelbeck et al. | |
| 6,763,226 B1 | 7/2004 | McZeal, Jr. | |
| 6,769,022 B1 | 7/2004 | DeKoning et al. | |
| 7,013,327 B1 * | 3/2006 | Hickman et al. | 709/208 |
| 7,024,695 B1 | 4/2006 | Kumar et al. | |
| 7,069,293 B2 | 6/2006 | Cox et al. | |
| 7,203,769 B2 * | 4/2007 | Schnier | 719/330 |
| 7,296,267 B2 | 11/2007 | Cota-Robles et al. | |
| 7,302,423 B2 | 11/2007 | De Bellis | |
| 7,454,443 B2 | 11/2008 | Ram et al. | |
| 7,502,353 B2 | 3/2009 | Bolz | |
| 7,509,426 B2 | 3/2009 | Park et al. | |
| 2002/0078060 A1 | 6/2002 | Garst et al. | |
| 2002/0129264 A1 | 9/2002 | Rowland et al. | |
| 2002/0184398 A1 | 12/2002 | Orenshteyn | |
| 2003/0014521 A1 | 1/2003 | Elson et al. | |
| 2003/0061404 A1 | 3/2003 | Atwal et al. | |
| 2003/0084248 A1 | 5/2003 | Gaither et al. | |
| 2003/0139174 A1 | 7/2003 | Rao | |

(Continued)

FOREIGN PATENT DOCUMENTS

WO WO-00/23898 4/2000

OTHER PUBLICATIONS

"6570P208 FOA Mailed Aug. 13, 2008 for U.S. Appl. No. 11/013,278 Whole Document", (Aug. 13, 2008).

(Continued)

*Primary Examiner* — S. Sough
*Assistant Examiner* — Phuong N Hoang
(74) *Attorney, Agent, or Firm* — Blakely, Sokoloff, Taylor & Zafman

(57) ABSTRACT

A system and method for connection of clients for management of systems. According to an embodiment of the invention, a method includes generating an instance of a program object for a client system, the client system being of a computer platform type, the program object being compatible with a plurality of different computer platform types; connecting the instance of the program object with an interface of a server; and managing an application on the server using the instance of the program object.

5 Claims, 7 Drawing Sheets

U.S. PATENT DOCUMENTS

| | | | |
|---|---|---|---|
| 2003/0158919 A1 | 8/2003 | Fomenko | |
| 2003/0177356 A1 | 9/2003 | Abela | |
| 2003/0177382 A1 | 9/2003 | Ofek et al. | |
| 2003/0195923 A1* | 10/2003 | Bloch et al. | 709/203 |
| 2003/0212654 A1 | 11/2003 | Harper et al. | |
| 2004/0003033 A1 | 1/2004 | Kamen et al. | |
| 2004/0024971 A1 | 2/2004 | Bogin et al. | |
| 2004/0083280 A1 | 4/2004 | Houston et al. | |
| 2004/0181537 A1 | 9/2004 | Chawla et al. | |
| 2004/0193461 A1 | 9/2004 | Keohane et al. | |
| 2004/0205144 A1 | 10/2004 | Otake | |
| 2005/0038771 A1 | 2/2005 | Sugihara et al. | |
| 2005/0066037 A1 | 3/2005 | Song et al. | |
| 2005/0138183 A1 | 6/2005 | O'Rourke et al. | |
| 2005/0144301 A1 | 6/2005 | Park et al. | |
| 2005/0228863 A1* | 10/2005 | Palmeri et al. | 709/205 |
| 2005/0278346 A1 | 12/2005 | Shang et al. | |
| 2006/0053112 A1 | 3/2006 | Chitkara et al. | |
| 2006/0150197 A1 | 7/2006 | Werner | |
| 2006/0159197 A1 | 7/2006 | Kraut et al. | |
| 2006/0167980 A1 | 7/2006 | Werner | |
| 2006/0168646 A1 | 7/2006 | Werner | |
| 2006/0168846 A1 | 8/2006 | Juan | |
| 2006/0206856 A1 | 9/2006 | Breeden et al. | |

OTHER PUBLICATIONS

"6570P207 FOA Mailed Aug. 17, 2007 for U.S. Appl. No. 11/013,277", Whole Document.
"6570P207 OA Mailed Jan. 7, 2008 for U.S. Appl. No. 11/013,277", Whole Document.
"6570P207 OA Mailed Mar. 12, 2007 for U.S. Appl. No. 11/013,277", Whole Document.
"6570P208 FOA Mailed Aug. 17, 2007 for U.S. Appl. No. 11/013,278", Whole Document.
"6570P208 OA Mailed Feb. 5, 2008 for U.S. Appl. No. 11/013,278", Whole Document.
"6570P208 OA Mailed Mar. 16, 2007 for U.S. Appl. No. 11/013,278", Whole Document.
"6570P209 FOA Mailed Aug. 28, 2007 for U.S. Appl. No. 11/012,803", Whole Document.
"6570P209 OA Mailed Jan. 24, 2008 for U.S. Appl. No. 11/012,803", Whole Document.
"6570P209 OA Mailed Mar. 16, 2007 for U.S. Appl. No. 11/012,803", Whole Document.
"6570P217 OA Mailed Feb. 21, 2008 for U.S. Appl. No. 11/027,812", Whole Documents.
"6570P220 OA Mailed Jan. 10, 2008 for U.S. Appl. No. 11/027,387", Whole Document.
"6570P220 OA Mailed Apr. 19, 2007 for U.S. Appl. No. 11/027,387", Whole Document.
"What is LDAP?", http://www.gracion.com/server/whatldap.html, (Dec. 7, 2004).
Tuttle, Steven, et al., "Understanding LDAP Design and Implementation", IBM.com Redbooks, (Jun. 2004), 77 pages.
USPTO, "6570P217 FOA Mailed Aug. 19, 2008 for U.S. Appl. No. 11/027,812", Whole Document.
USPTO, "6570P218 OA Mailed Sep. 4, 2008 for U.S. Appl. No. 11/026,323", Whole Document.
USPTO, "6570P220 OA Mailed Oct. 3, 2008 for U.S. Appl. No. 11/027,387", Whole Document.
Werner, Randolf, "Connection of Clients for Management of Systems", U.S. Appl. No. 11/026,604, filed Dec. 30, 2004.
Werner, Randolf, "Interface for External System Management", U.S. Appl. No. 11/027,812, filed Dec. 29, 2004.
Werner, Randolf, "Security for External System Management", U.S. Appl. No. 11/026,323, filed Dec. 29, 2004.
*Non-Final Office Action for* U.S. Appl. No. 11/013,278, Mailed Dec. 23, 2008, 28 pages.
*Non-Final Office Action for* U.S. Appl. No. 11/012,803, Mailed Dec. 23, 2008, 22 pages.
*Notice of Allowance for* U.S. Appl. No. 11/027,387, Mailed Feb. 23, 2009, 8 pages.
*Notice of Allowance for* U.S. Appl. No. 11/026,323, Mailed Feb. 25, 2009, 19 pages.
*Final Office Action for* U.S. Appl. No. 11/012,803, Mailed Jul. 22, 2008, 22 pages.
*Final Office Action for* U.S. Appl. No. 11/013,277, Mailed Aug. 7, 2008, 22 pages.
*Non-Final Office Action for* U.S. Appl. No. 11/013,277, Mailed Jan. 6, 2009, 22 pages.
*Non-Final Office Action for* U.S. Appl. No. 11/027,812, Mailed Apr. 2, 2009, 19 pages.
Notice of Allowance for U.S. Appl. No. 11/012,803, Mailed Jun. 10, 2009, 27 pages.
Notice of Allowance for U.S. Appl. No. 11/013,278, Mailed Jun. 11, 2009, 25 pages.
Notice of Allowance for U.S. Appl. No. 11/013,277 dated Jun. 25, 2009; 24 pages.
Notice of Allowance for U.S. Appl. No. 11/026,323, Mailed Jul. 27, 2009, 9 pages.
Notice of Allowance for U.S. Appl. No. 11/027,387, Mailed Aug. 7, 2009, 10 pages.
Notice of Allowability for U.S. Appl. No. 11/012,803), Mailed Sep. 3, 2009, 12 pages.
Final Office Action for U.S. Appl. No. 11/027,812, Mailed Nov. 10, 2009, 19 pages.
*Non-Final Office Action for* U.S. Appl. No. 11/027,812, Mailed Apr. 14, 2010.
Notice of Allowance for U.S. Appl. No. 11/027,812, Mailed Sep. 30, 2010, 21 pages.
"Microsoft Management Console 2.0", About MMC, http://msdn.microsoft.com/en-us/library, (2003).
"Microsoft Management Console 2.0", MMC Versions and Redistributables, http://msdn.microsoft.com/en-us/library, (2003).
"Microsoft Management Console 2.0", MMC 2.0 Glossary, http://msdn.microsoft.com/en-us/library, (2003).
Bellwood, Tom, et al., "UDDI Version 3.0", UDDI Spec Technical Committee Specification, Oasis Open, (Jul. 19, 2002).
Bray, Tim, et al., "Extensible Markup Language (XML) 1.0 (Third Edition)", W3C Recommendation, (Feb. 4, 2004).
Chinnici, Roberto, et al., "Web Services Description Language (WSDL) Version 1.2", W3C Working Draft, (Jul. 9, 2002).
Gudgin, Martin, et al., "SOAP Version 1.2", W3C Working Draft, (Jul. 9, 2001).
Mitra, Nilo, et al., SOAP Version 1.2 Part 0: Primer, W3C Recommendation, (Jun. 24, 2003).
Shannon, Bill, "Java 2 Platform, Enterprise Edition Specification, v1.4", Sun Microsystems, Santa Clara, CA, (Nov. 24, 2003).
Winer, Dave, "XML-RPC Specification", XML-RPC.com, (Jun. 30, 2003).

* cited by examiner

CONNECTION OF CLIENTS FOR MANAGEMENT OF SYSTEMS

TECHNICAL FIELD

Embodiments of the invention generally relate to the field of client/server systems and, more particularly, to a system and method for connection of clients for management of systems.

BACKGROUND

A server may connect with many different types of client platforms. For example, a client system that seeks to manage a system or systems on the server may utilize one of multiple different computer platforms. In order to manage the system or systems, the client system is required to connect with the server.

In one type of operation, each server may utilize an object, such as a snap-in, to provide a connection with the interface of a server. The object may provide management functions for the client system and enable the external management of systems.

However, conventional client systems may require varying types of objects to connect to an interface. Each client system may be built on a platform that requires a certain type of management object. In a conventional system, which may be an enterprise hosting many systems, multiple types of different objects may be needed to support all possible client systems.

SUMMARY OF THE INVENTION

A system and method for connection of clients for management of systems are described.

According to a first embodiment of the invention, a method includes generating a generating an instance of a program object for a client system, with the client system being of a computer platform type and the program object being compatible with a plurality of different computer platform types. The method further includes connecting the instance of the program object with an interface of a server; and managing an application on the server using the instance of the program object.

According to a second embodiment of the invention, a server includes an interface, with the interface being a framework for a program object to be connected with the interface by a client system, and with the program object being usable by or compatible with a plurality of different computer platforms. The server further includes an application server, the application server including an application, with the application to be managed by the client system using the program object connected with the interface.

According to a third embodiment of the invention, a system includes a plurality of client agents. The client agents may include a first client agent with a first instance of a program and the second client agent with a second instance of the program. The server may also include a server, with the server having a web service-based interface, the instances of the program being connected with the interface, and having an application server, with the application server including one or more applications to be managed through instances of the program.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
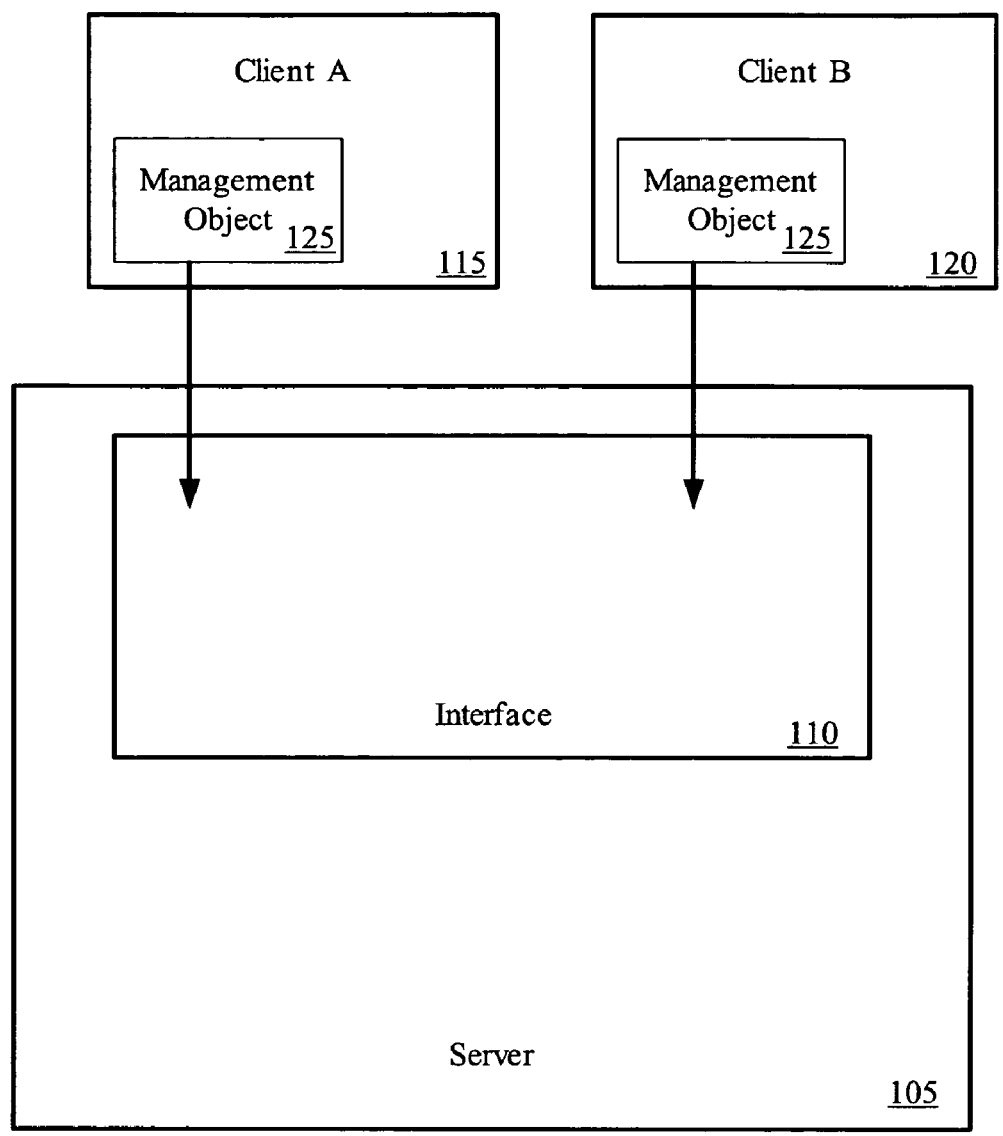
FIG. 1 is an illustration of an embodiment of a management object used to provide system management by multiple clients.

Embodiments of the invention are generally directed to a system and method for connection of clients for management of systems.

As used herein, "snap-in" means a program or application, such as a program object, that may be attached to another program or application and that will function as if it is a part of the program or application to which it is attached.

As used herein, "Web service" means a software application assessable in a web environment. Web service includes the term as used by the World Wide Web Consortium (W3C) in applicable standards.

In one embodiment of the invention, a client system is connected to a server through an object that is usable with multiple different systems. In one embodiment of the invention, a plurality of client systems are connected to a server, with each client system using an instance of the same program object. The purpose of such client systems may include the management of one or more systems or applications supported by the server.

In one embodiment of the invention, a plurality of client systems are connected with an interface of a server using a common program or object. In one embodiment, the program or object is connected or attached with an interface that can be assessed by multiple types of platforms, and that may be referred to as a universal interface. In one embodiment, multiple programs or objects are attached to a web service environment.

In one embodiment of the invention, a program object is a modular component of an interface to a server. In one embodiment, the interface is a web service, which thus can be accessed by multiple difference types of platforms. In one embodiment, multiple platforms use the same type of object to access the interface, thereby providing for ease of access and integration of a system.

In one embodiment of the invention, an object is a Java-based management console. Because the object is Java-based, the object can be run on any platform that includes a Java virtual machine (VM). In one example, the object is implemented as a Java applet. An applet is a small program or application, often written in Java and executed by a web browser. An applet may be downloaded quickly and can be used by any system that is equipped with a Java- or ActiveX-enabled browser. The object may be downloaded from a web service interface or from any web server containing the object. In one embodiment, the object acts as a management tool for access to a web server from multiple different types of client systems.

Objects such as snap-ins may be used in management operations. For example, snap-ins are basic components of Microsoft's Management Console (MMC). In such a system, the snap-ins may act as the actual management tools, while the management console or host is a framework for the snap-ins are added. For example, a console in MMC is a container for actual operations, and is known as a "tools host.", acting as a framework in which management tools can operate. MMC is an application that provides a graphical-user interface (GUI) and a programming framework in which consoles can be created, saved, and opened. In a MMC environment, a user may select from a list of all installed snap-ins. Multiple copies of a particular snap-in can be added to apply to separate workstations. Snap-ins for MMC may be produced by many different vendors, and users may develop snap-ins to for management processes in their systems and custom applications. To create a console, an administrator runs the MMC executable file to open an empty console and chooses from among a list of all the tools installed on the system. Because consoles exist as files, an administrator can create them and then send them as, for example, e-mail attachments to developers responsible for specific tasks.

However, the MMC system is limited to a Windows platform. If a server operation serves multiple different client platforms, an MMC system cannot be utilized for each system as the operation of the snap-in is limited to Windows. The UI (user interface) for MMC is not portable and cannot be transformed to other systems. For this reason, there are generally multiple access methods required to handle multiple platform types.

In an embodiment, an object is utilized to provide management of multiple types of system from outside of the system. The object may be utilized, for example, in the start and stop of systems and to receive event errors. In one embodiment of the invention, a object is provided for connection with a web service interface.

In an embodiment of a web application server, a startup and control framework may be utilized to start, stop, and monitor a system such as a J2EE (Java 2 Platform, Enterprise Edition) instance. The framework may be used to monitor and control an application remotely. In one embodiment of the invention, a web service is used in the startup and control framework. In one embodiment, a single startup and control framework may be addressed by multiple types of client systems for application monitoring and control. In one embodiment, a platform independent framework is provided for external management of systems. In an embodiment, an application server (a component server that is compliant with the J2EE environment) may be accessed by multiple different client systems using the same interface.

In one embodiment of the invention, a startup and control program, such as, for example, the Jcontrol program utilized in a product produced by SAP AG (SAP), is started through a web service interface. In an embodiment, the web service interface may start the startup and control program regardless of the type of platform utilized by a client. In one example, a managed system may comprise a J2EE instance. The startup and control program may initialize and monitor the J2EE instance, continuously checking the status of the elements of the instance and restarting any terminated processes.

In general, a web service provides a software system designed to support interoperable machine-to-machine interaction over a network. Web services conform to certain standards and thus provide a means of communication between applications on different platforms. Web services provide a mechanism for applications to communicate and interrelate in a platform independent fashion. Web services therefore may enable a service-oriented architecture in which certain services are reusable and transferable among heterogeneous environments, providing a common method for actions such as accessing data, providing instructions, and instituting other such actions.

Under an embodiment of the invention, a web service interface is implemented in a J2EE (Java 2 Platform, Enterprise Edition) platform. The J2EE platform is described in the J2EE specification, including as provided in version 1.4, Nov. 24, 2003. The implementation of a web service in a J2EE platform assists in providing portability of the client management processes.

The standards that are followed in web services include the use of XML (eXtensible Mark-up Language) for communication, including Extensible Markup Language (XML) 1.0 (Third Edition), Feb. 4, 2004, by the World Wide Web Consortium (W3C); SOAP (simple object access protocol) for the exchange of information, including SOAP Version 1.2, Jun. 24, 2003 by the W3C; WSDL (web services description language) for description of web service details, including Web Service Description Language Version 2.0, Aug. 3, 2003 by the W3C; and UDDI (universal description, discovery, and integration) for looking up web services, including Universal Description, Discover, and Integration Version 3.0. Numerous other specifications and recommendations may affect the structure and design of a web service. A web service has an interface that is described in a machine-processable format, with such format being WSDL. Other systems will interact with a web service in the manner that is prescribed in the web service's description using SOAP-messages, which are typically conveyed using HTTP (Hypertext Transfer Protocol).

Under an embodiment, a web service interface for monitoring systems is implemented using an open source product. In one embodiment, a system is implemented with SOAP, which is a light-weight protocol for exchanging messages between computer software. SOAP is intended to provide an extensible and decentralized framework that can work over multiple computer network protocol stacks. In this regard, remote procedure calls can be modeled as an interaction of several SOAP messages. SOAP can be run on top of all Internet protocols, but SOAP is commonly run on HTTP, as provided by W3C.

In general, any web service enabled client that can handle XML-RPC (Remote Procedure Calling) encoded communications may access a web service interface. XML-RPC includes a set of implementations to allow software running on disparate operating systems in different environments to make procedure calls over the Internet. The XML-RPC is defined by the relevant specification, XML-RPC Specification, Jun. 15, 1999. The applicable clients may include, but are not limited to, C/C++, Microsoft.NET, JAVA, and numerous other clients.

For the purposes of web services, when one application is to allow connection and access by other applications, the process is described utilizing WSDL. WSDL is used to specify details of a web service, thereby allowing an external system to utilize the web service without prior knowledge of details of the web service. WSDL provides a format that describes a network service as a set of endpoints operating on messages containing either document-oriented or procedure-oriented information. A WSDL document defines services as collections of network endpoints, or ports. In WSDL, the abstract definition of endpoints and messages is separated from the defined network deployment or data format bindings. This process thereby allows the reuse of abstract definitions, the definitions being messages, which are abstract descriptions of the data being exchanged, and port types, which are abstract collections of operations. The concrete protocol and data format specifications for a particular port type constitute a reusable binding. A port is defined by associating a network address with a reusable binding, with a collection of ports defining a service. In the provision of a web service, a WSDL document uses the following elements in the definition of services:

(a) Types—A container for data type definitions using a type system;
(b) Message—An abstract, typed definition of data being communicated;
(c) Operation—An abstract description of an action supported by the service;
(d) Port Type—An abstract set of operations supported by one or more endpoints;
(e) Binding—A concrete protocol and data format specification for a particular port type;
(f) Port—A single endpoint defined as a combination of a binding and a network address; and
(g) Service—A collection of related endpoints.

FIG. 1 is an illustration of an embodiment of a management object used to provide system management by multiple clients. In the illustrated example, a server 105 includes an interface 110. The server 105 may provide connection through the interface 110 for management functions. In one example, the server 105 is connected with multiple client systems that may utilize different system platforms. In this illustration, client A 115 utilizes a first platform, such as a Windows platform, and client B 120 utilizes a second platform, such as a UNIX platform. In one embodiment of the invention, both client A 115 and client B 120 connect with the interface 110 using instances of the same management object 125. In this embodiment, the interface 110 is an interface that allows connection with multiple different types of systems. In one embodiment, the management object 125 acts as a component of the interface 110 for management purposes, with the object providing the management capabilities for the clients and the interface providing a framework for the operation of the object 125. In another embodiment, a first client may connect to the interface using an MMC snap-in while a second client connects to the interface using the management object 125

Figure 2:
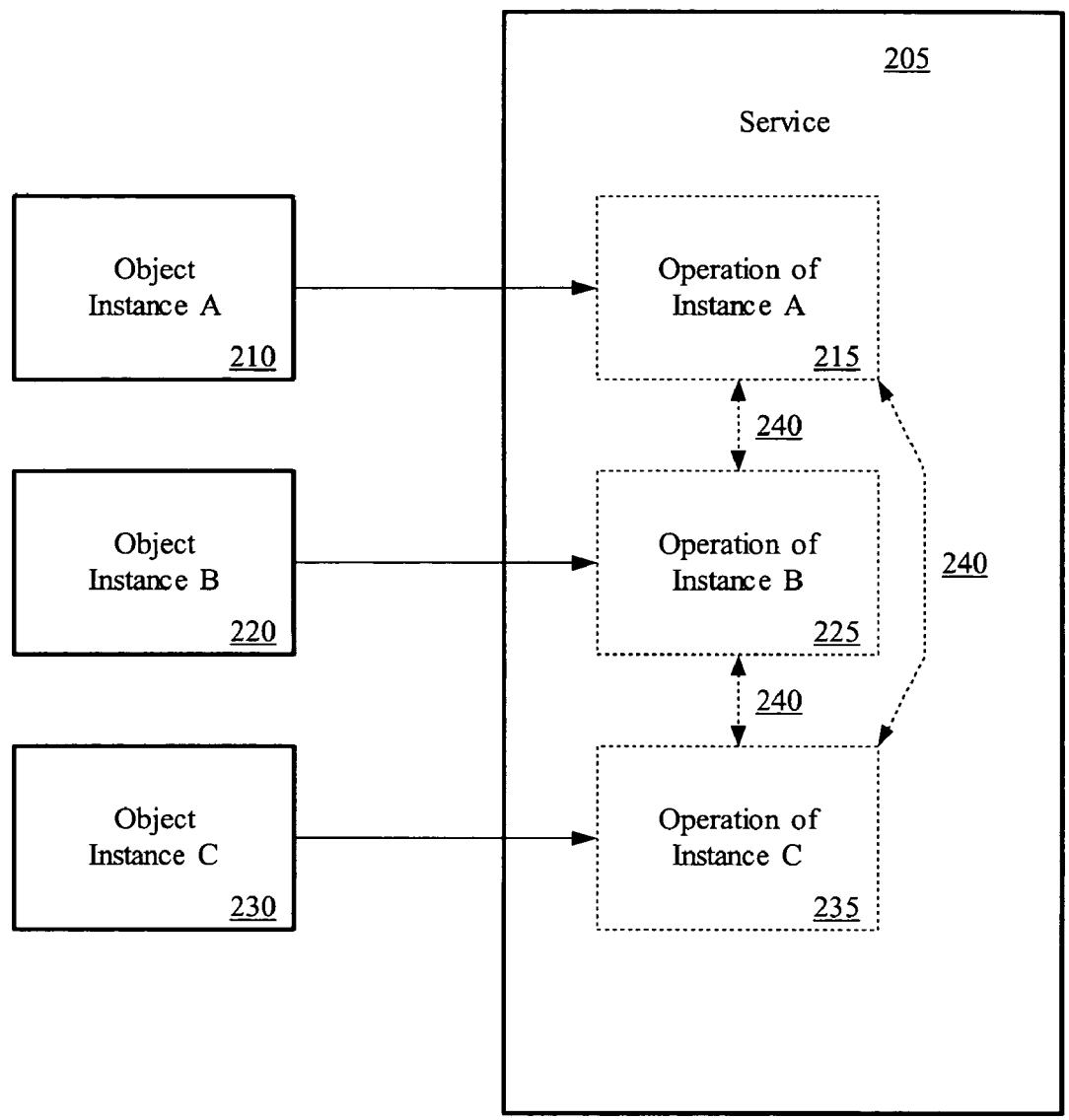
FIG. 2 is an illustration of an embodiment of system operation using management objects.

FIG. 2 is an illustration of an embodiment of system operation using management objects. In this illustration, multiple instances of an object are attached to a service 205 to provide management functions. The object instances illustrated are object instance A 210, object instance B 220, and object instance C 230, with each object instance being associated with a different client of the service 205. In one example, each of the clients may be instituted on a different type of platform. The object instances act as a part of the service 205, with the relationship being illustrated as the operation of instance A 215, the operation of instance B 225, and the operation of instance C 235. The instances are instances of a single type of object, with the object being usable with varying clients. In another embodiment, the instances are a mixture of one or more instances of the object and one or more MMC snap-ins. In one example, the service 205 comprises a web service. In this illustration, the use of each object instance for management functions is independent of the other instance, with each instance being unaware of the presence of the other instances 240.

Figure 3:
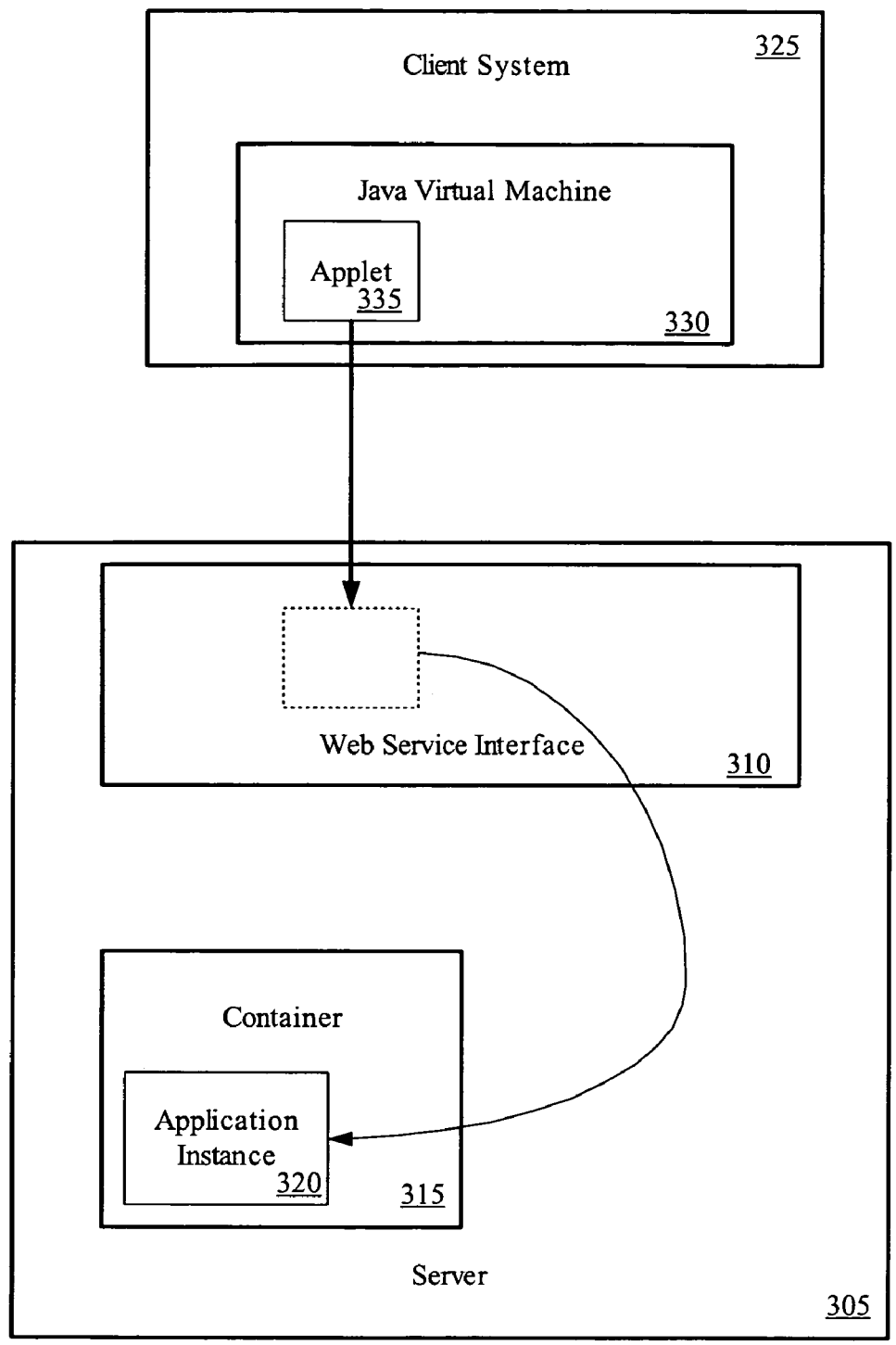
FIG. 3 illustrates an embodiment of a client attached with a web service interface of a server.

FIG. 3 illustrates an embodiment of a client attached with a web service interface of a server. In this illustration, a server 310 includes a web service interface 305, with the web service interface 310 being capable of providing connection with multiple different kinds of clients. The server 305 includes a container 315 to support applications, such as a J2EE container. The container 315 includes an application instance 320, such as an application utilizing enterprise Java beans (EJB).

In the illustrated environment, a client system 325 is to manage the application instance 320 through the web service interface 310. In one embodiment, the client system 325 includes a Java virtual machine 330 to support a Java applet or other Java object 335. The applet 335 is connected the web service interface 310 and provides management functions for the client system 325 in the management of the application instance 320. In one embodiment, the applet 335 is downloaded from the web service interface 310.

Figure 4:
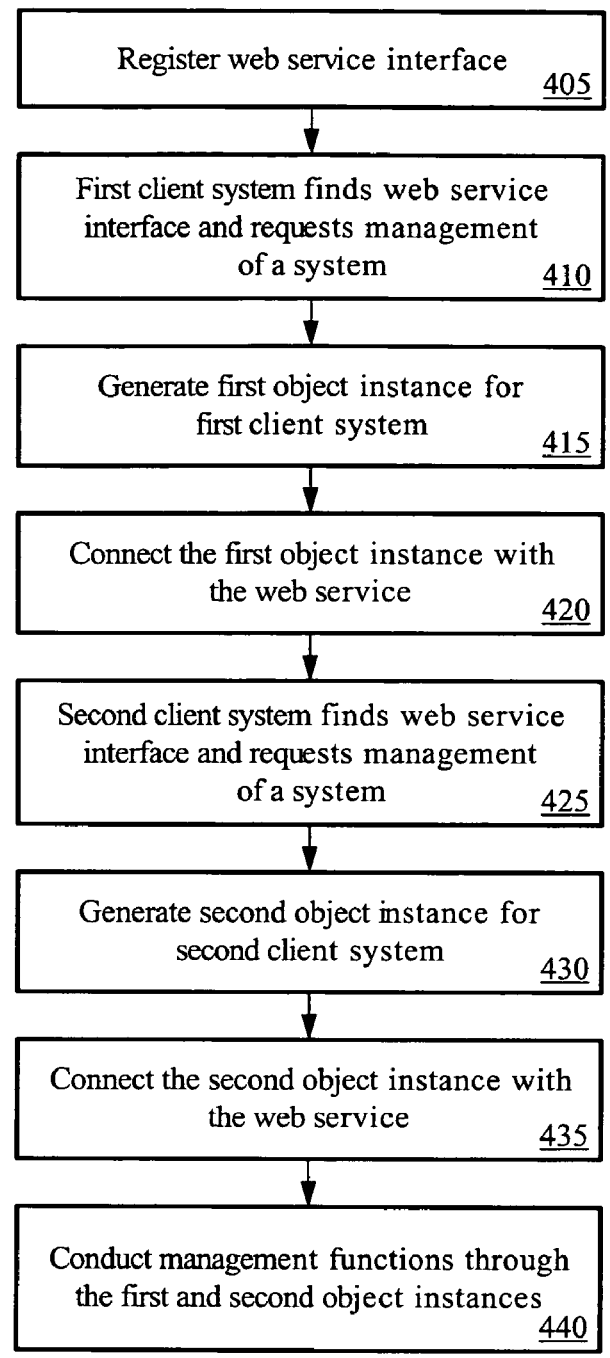
FIG. 4 is a flow chart to illustrate a process of system management using instances of a program object connected with an interface.

FIG. 4 is a flow chart to illustrate a process of system management using instances of a program object connected with an interface. In this process, a web service interface for a server is registered 405, with the interface to provide connections for client systems. A first client system finds the web service interface and requests management of a system on the server 410. A first object is generated or obtained for the client system 415 and is connected with the web service 420.

A second client system also finds the web service interface and request management of a system on the server 425, which may or may not be the same system to be managed by the first client system. A second object is generated or obtained for the second client system 430 and the second object is connected with the web service 435. In one embodiment, the first object and the second object are instances of the same object. In another embodiment, one of the objects is an object that is compatible with multiple platforms, such as a Java program or applet, and one of the objects is an MMC snap-in.

Management services are conducted through both the first and second objects 440. The management services are provided by the object instances, with the interface acting as a framework for the objects.

Figure 5:
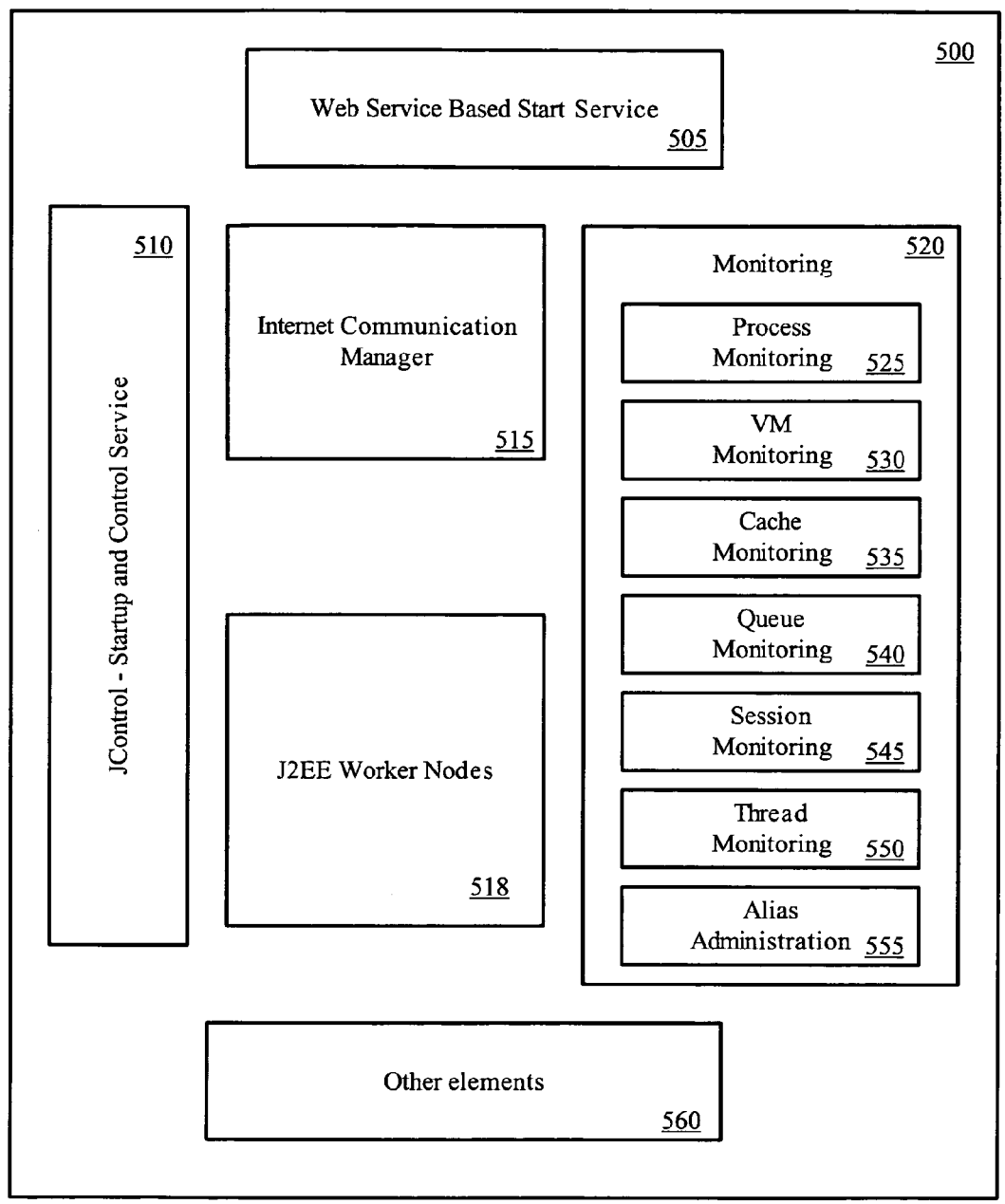
FIG. 5 is an illustration of an embodiment of an externally managed J2EE instance.

FIG. 5 is an illustration of an embodiment of an externally managed J2EE instance. In this illustration, a J2EE instance 500 includes a web service based start service 505. For any supported platform, the web service based start system 505 will initiate a startup and control service 510. The startup and control service 510 may then provide startup and control of J2EE worker nodes 518. In one embodiment, the web service based start service 505 may accept attachment of a management object for a client. The client may provide management of the operation of the J2EE instance 500 using the object.

FIG. 5 also illustrates an Internet communication manager 515 to provide communications for the instance 500. Further, there is shown monitoring elements 520 to monitor operations of the instance 500. The monitoring 520 may include, but is not limited to, process monitoring 525, virtual machine (VM) monitoring 530, cache monitoring 535, queue monitoring 540, session monitoring 545, thread monitoring 550, and alias administration 555. Other elements 560 may also be included in the J2EE instance 500.

Figure 6:
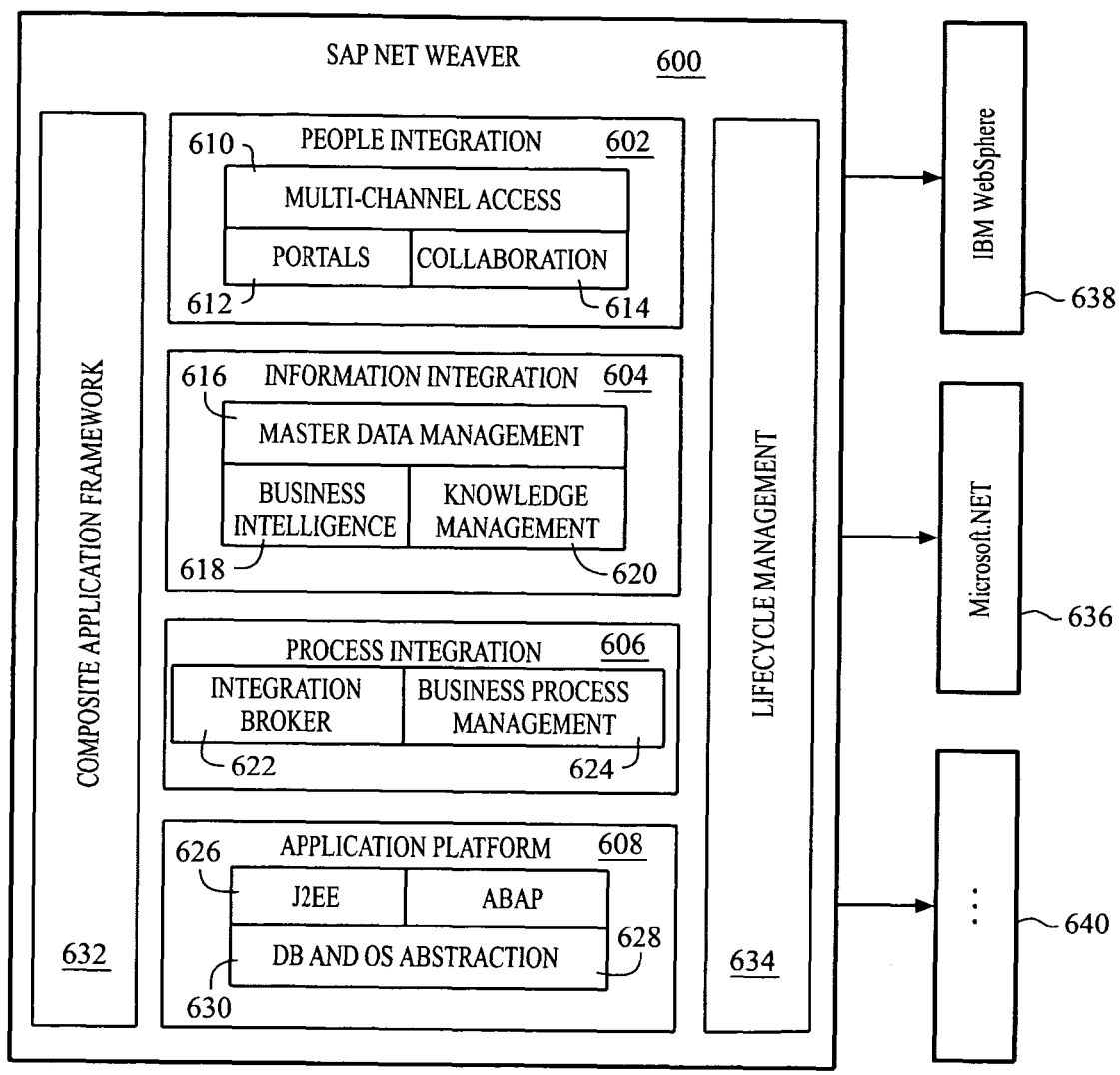
FIG. 6 is a diagram illustrating an embodiment of a system architecture.

FIG. 6 is a diagram illustrating an embodiment of a system architecture. In one embodiment, the diagram illustrates core components of the SAP NetWeaver architecture 600, in which a web service interface for external management may be implemented. The system architecture 600 comprises various SAP platforms that are merged together to provide the integration of people, information, and processes in one solution. The architecture 600 includes people integration 602, information integration 604, process integration 606, and an application platform 608.

People integration 602 is performed using a portal solution 612 and a platform to work in collaboration 614. Users are provided a multi-channel access 610 to ensure mobility.

Examples of the portal solution 612 include SAP Enterprise Portal, SAP Mobile Engine, and Collaboration Package for SAP Enterprise Portal. Information integration 604 refers to the conversion of information into knowledge. Information integration 604 provides efficient business intelligence 618 and knowledge management 620 using, for example, SAP products such as Business Information Warehouse (BW) and Knowledge Management (KM). Further, consolidation of master data management beyond system boundaries is performed using SAP's Master Data Management (MDM) 616. Process integration 606 refers to optimized process management using integration broker or SAP exchange infrastructure 622 and business process management 624 techniques. Examples of products to perform process integration 606 include Exchange Infrastructure (XI) and Business Process Management (BPM).

An application platform 608 may include SAP's Web Application Server (Web AS), which is the basis for SAP applications. Web AS, which may be independent of the database and operating system 630, includes a J2EE engine 626 in combination with the proprietary ABAP (Advanced Business Application Programming) engine or instance 628 to further enhance the application platform 608. In one embodiment, the application platform 608 includes operation of a web service to provide an interface for heterogeneous external clients to manage systems provided by the application platform 608. In one embodiment, the web service may act as a framework for instances of an object to connect client agents to the application platform.

The architecture 600 further includes a composite application framework 632 to provide various open interfaces (APIs) and a lifecycle management 634, which is an extension of a previously existing transport management system (TMS). As illustrated, the architecture 600 further provides communication with Microsoft.NET 636, International Business Machine (IBM) WebSphere 638, and other such systems 640.

Figure 7:
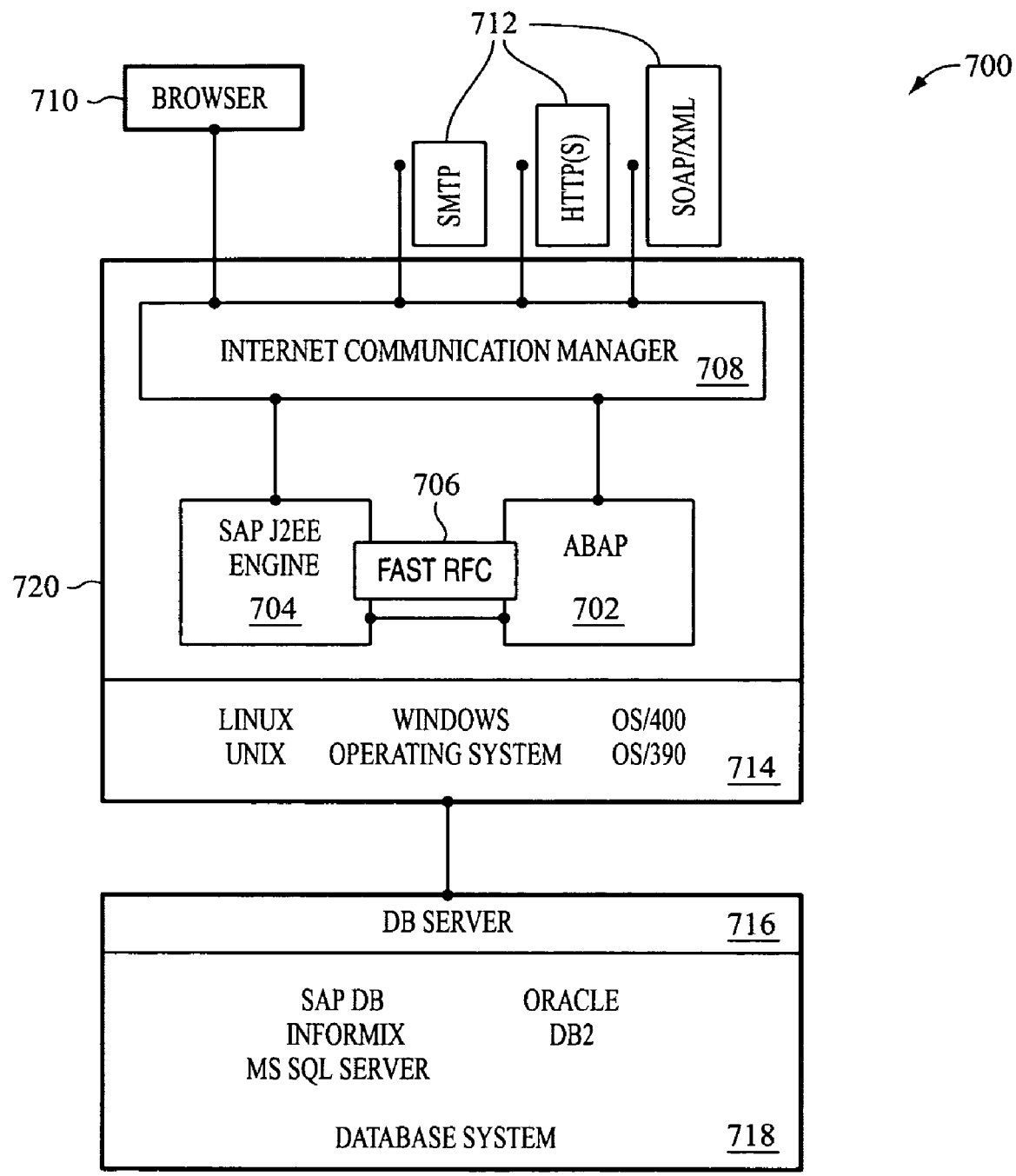
FIG. 7 is a block diagram illustrating an embodiment of an architecture including a Web Application Server.

FIG. 7 is a block diagram illustrating an embodiment of an architecture including a Web Application Server. In this illustration, an architecture 700 serves as an application platform (which may be, for example, the application platform 608 of provided in FIG. 2) for SAP NetWeaver and other SAP products. The architecture 700 includes a Web AS 720 having an ABAP program engine 702, which provides the ABAP development and runtime environment, with the dependability, scalability, and inter-process independence of operating systems 714 and database systems 718. The operating system 714 may include LINUX, UNIX, Windows, OS/390, OS/400, and other such operating systems. The database system 718 may include SAP database (SAP DB), Informix, Oracle, DB2, and other such database systems. The database system 718 is based on a database server 716, such as Microsoft Sequential Query Language (MS SQL) server.

The Web AS 720 with ABAP engine 702 further includes a J2EE program engine 704. The J2EE may support one or more program instances. The J2EE engine 704 is in communication with the ABAP engine 702 via a fast Remote Function Call (RFC) connection 706. The ABAP engine 702 and the J2EE engine 704 are further in communication with an Internet Communication Manager (ICM) 708. The ICM 708 is provided for handling and distributing queries to various individual components of the architecture 700. The architecture 700 further supports a browser 710, such as Microsoft Internet Explorer, Netscape Navigator, and other modified variations of mobile end devices, such as personal digital assistants (PDAs), pocket computers, smart cell phones, other hybrid devices, and the like. The Web AS 720 also supports various protocols and standards 712, such as HyperText Markup Language (HTML), eXtensible Markup Language (XML), Wireless Markup Language (WML), Hypertext Transfer Protocol (HTTP) and Hypertext Transfer Protocol, Secure (HTTP(S)), Simple Mail Transfer Protocol (SMTP), Web Distributed Authority and Versioning (WebDAV), Simple Object Access Protocol (SOAP), Single Sign-On (SSO), Secure Sockets Layer (SSL), X.509, Unicode, and the like. In one embodiment, the supported protocols 712 include SOAP and XML for the operation of web service to provide an interface for external management of systems on the Web AS 720. In one embodiment, the web service is a framework for program objects, the snap-ins providing management functions for systems.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention. An embodiment may include a machine-readable medium having tangibly stored thereon data representing sequences of instructions that, when executed by a processor, cause the processor to perform certain operations.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method comprising:
receiving at an interface of a server a request for remote management of a first application that is running on the server, the interface comprising a web service and the server comprising a Java 2 Platform, Enterprise Edition (J2EE) application server, the request being received from a first client system, the first client system being of a first computer platform type;
obtaining a first instance of a program object for the first client system, the program object comprising a Java object, the program object being compatible with a plurality of different computer platform types;
connecting the first instance of the program object with the interface of the server;
remotely managing the first application running on the server by the first client system using a plurality of management services provided by the first instance of the program object;
receiving a request for remote management of a second application that is running on the server, the request being received from a second client system, the second client system being of a second computer platform type that is different than the first computer platform type;
obtaining a second instance of the program object for the second client system;
connecting the second instance of the program object with the interface of the server; and
remotely managing the second application running on the server by the second client system using a plurality of management services provided by the second instance of the program object;
wherein remotely managing an application includes initializing and monitoring the application, and wherein initializing and monitoring the application includes continuously checking the status of the elements of the application and restarting terminated processes; and
wherein the plurality of management services provided by the first and second instances of the program object for remotely managing the first application and the second application include services for the first and second client system to start the first or second application, stop the first or second application, and monitor operations of the first or second application.

2. A server system comprising:
a processor operable for processing instructions; and
at least one memory element in communication with the processor, the memory element storing instructions for:
an interface, the interface comprising a web service, the interface to be a framework for a first instance of a program object to be connected with the interface by a first client system of a first computer platform type and a second instance of the program object to be connected with the interface by a first client system of a second computer platform type, the program object comprising a Java object, the program object being usable by a plurality of different computer platforms and comprising a plurality of management services; and
a Java 2 Platform, Enterprise Edition (J2EE) application server, the application server including a first application and a second application running on the application server, the first application to be remotely managed by the first client system using a plurality of management services provided by the first instance of the program object connected with the interface and the second application to be remotely managed by the second client system using a plurality of management services provided by the second instance of the program object connected with the interface;
wherein remotely managing an application includes initializing and monitoring the application, and wherein initializing and monitoring the application includes continuously checking the status of the elements of the application and restarting terminated processes; and
wherein the plurality of management services provided by the first and second instances of the program object for remotely managing the first application and the second application include services for the first and second client system to start the first or second application, stop the first or second application, and monitor operations of the first or second application.

3. The server system of claim 2, wherein the program object comprises an applet.

4. The server system of claim 2, wherein the framework is further operable for connecting the first and second instances of the program object to the corresponding client systems.

5. A machine-readable storage medium having tangibly stored thereon data representing sequences of instructions that, when executed by a processor, cause the processor to perform operations comprising:
receiving at an interface of a server a request for management of a first application that is running on the server, the interface comprising a web service and the server comprising a Java 2 Platform, Enterprise Edition (J2EE) application server, the request being received from a first client system, the first client system being of a first computer platform type;
generating a first instance of a program object for first client system, the program object comprising a Java object, the program object being compatible with a plurality of different computer platform types;
connecting the first instance of the program object with the interface of the server;
remotely managing the first application on the server by the first client system using a plurality of management services provided by the first instance of the program object;
receiving a request for remote management of a second application that is running on the server, the request being received from a second client system, the second client system being of a second computer platform type that is different than the first computer platform type;
generating a second instance of the program object for the second client system;
connecting the second instance of the program object with the interface of the server; and
remotely managing the second application running on the server by the second client system using a plurality of management services provided by the second instance of the program object;
wherein remotely managing an application includes initializing and monitoring the application, and wherein initializing and monitoring the application includes continuously checking the status of the elements of the application and restarting terminated processes; and
wherein the plurality of management services provided by the first and second instances of the program object for remotely managing the first application and the second application include services for the first and second client system to start the first or second application, stop the first or second application, and monitor operations of the first or second application.

* * * * *